Dec. 29, 1925.

R. F. CAREY 1,567,912

HYDRAULIC CLUTCH

Filed Jan. 16, 1923     6 Sheets-Sheet 1

Inventor
Robert F. Carey
By James L. Norris
Attorney

Dec. 29, 1925.  1,567,912

R. F. CAREY

HYDRAULIC CLUTCH

Filed Jan. 16, 1923   6 Sheets-Sheet 2

R. F. CAREY

HYDRAULIC CLUTCH

Filed Jan. 16, 1923

Dec. 29, 1925.  
R. F. CAREY  
HYDRAULIC CLUTCH  
Filed Jan. 16, 1923  
1,567,912  
6 Sheets-Sheet 4

Inventor
Robert F. Carey
By
Attorney

Dec. 29, 1925.                                      1,567,912
R. F. CAREY
HYDRAULIC CLUTCH
Filed Jan. 16, 1923          6 Sheets-Sheet 5

Inventor
Robert F. Carey,
By James L. Norris
Attorney

Dec. 29, 1925.

R. F. CAREY 1,567,912

HYDRAULIC CLUTCH

Filed Jan. 16, 1923   6 Sheets-Sheet 6

Inventor
Robert F. Carey
By
Attorney

Patented Dec. 29, 1925.

1,567,912

UNITED STATES PATENT OFFICE.

ROBERT FALKLAND CAREY, OF LEIGH-ON-SEA, ENGLAND.

HYDRAULIC CLUTCH.

Application filed January 16, 1923. Serial No. 612,952.

*To all whom it may concern:*

Be it known that I, ROBERT FALKLAND CAREY, a subject of the King of Great Britain, residing at Leigh-on-Sea, Essex, England, have invented certain new and useful Improvements in Hydraulic Clutches, of which the following is a specification.

This invention relates to that class of apparatus known as hydraulic clutches in which connection between the driving and driven ends of the apparatus is established by locking liquid under pressure in the apparatus and wherein the release between the driving and driven ends is obtained by opening a passage to allow of free circulation of the liquid, and in which variations of speed between zero and maximum can be obtained by allowing the oil under pressure to circulate to a greater or lesser extent as the fluid passage is more or less restricted at will.

The objects of my invention are to simplify the construction of such apparatus, thus reducing size and weight and cheapening cost of production; to obtain, as near as is practical, perfect mechanical balance of parts, which is a most important feature for high speed running; to so balance all pressures and thrusts that the bearings are practically relieved of any load except weight of the parts themselves, thus eliminating wear and allowing of a very simple and cheap construction of bearing. Further objects are to so construct the valve or restricting device used for curtailing the circulation of the liquid that a great fineness of control of the speed may be obtained, and to obtain a solid drive at full speed in a simple manner.

A further object is to provide means to allow the clutch power to be limited to a predetermined torque, whether acting hydraulically or on the solid drive, and also to do away with the use of packings altogether or to so construct the apparatus that the packings can be renewed without dismantling the clutch.

For the purpose of my invention I employ a revolving member driven by the prime mover or source of power which carries a plurality of radial or approximately radial cylinders suitable for centrifugal force, each containing a freely reciprocating piston the outward motion of which is due to centrifugal force, and of which the inward motion is imparted by a multistroke cam shaped track which surrounds and embraces the whole of the cylinders and pistons, said track being attached to, or being formed as a part of, a member capable of rotation attached to the work to be driven. The member just referred to has attached to it or formed as a part of it a valve or fluid distributing apparatus in which are formed inlet and outlet ports, properly positioned in relation to the track, to connect the various cylinders to the inlet or the outlet at the proper times, the outlet port or ports of said valve being connected to a pressure chamber passage provided with a control valve by means of which the flow of the liquid through the passage may be partially restricted or altogether stopped. The inlet ports are in communication with the casing.

A dog or other form of clutching apparatus is also preferably provided to give a solid drive at top speed.

The clutch comprises a driving end and a driven end.

The driving end, which is driven by the prime mover, carries the radial cylinders and pistons. The cylinders are usually made in one block called the rotor.

The pistons, which are preferably free, depend for their outward movement on centrifugal force, the shaped track imparting the inward motion.

The pistons may be ball or roller pistons, themselves revolving around the track or ball or roller headed pistons.

I prefer the ball piston as giving the simplest construction, but if ball or roller headed pistons be used I prefer to form an aperture in the piston so that the fluid pressure can act directly on the ball or roller.

The driven end is attached to the work and revolves with it and carries the multistroke cam shaped track and the valve or fluid distributing apparatus and preferably also carries the circulation passage with the control or restricting valve. The outer casing for containing the liquid may either be attached to the driving end and revolve with it, or said casing may be fixed.

The track may be elliptical, so as to give two in and out reciprocations per revolution but such track may be of other shape to give more than two complete reciprocations of the pistons at each revolution of the rotor, in which case the fluid distributing valve would be provided with a suitable number of inlet and outlet ports.

Owing however to the multiplicity of ports required, more than two are not likely to be used in practice. In all cases, however, the tracks have a common feature in order to allow centrifugal force to act for imparting the outward movement to the pistons, that is that all bends must be in the same direction from the tangent at any point inward towards the centre.

In practice the track will probably always be elliptical, the valve having two inlet and two outlet ports.

In my description therefore I confine myself to describing an apparatus having an elliptical track. All such tracks perfectly balance weights and pressures and for brevity in my claims I refer to all such tracks that I may use in connection with my invention as cam tracks, the valve in connection with such having one inlet and one outlet port positioned alternately around the axis for every inward and outward stroke per revolution imparted to each piston.

My invention will be clearly understood from the following description aided by the annexed drawings, in which.

Figure 1:
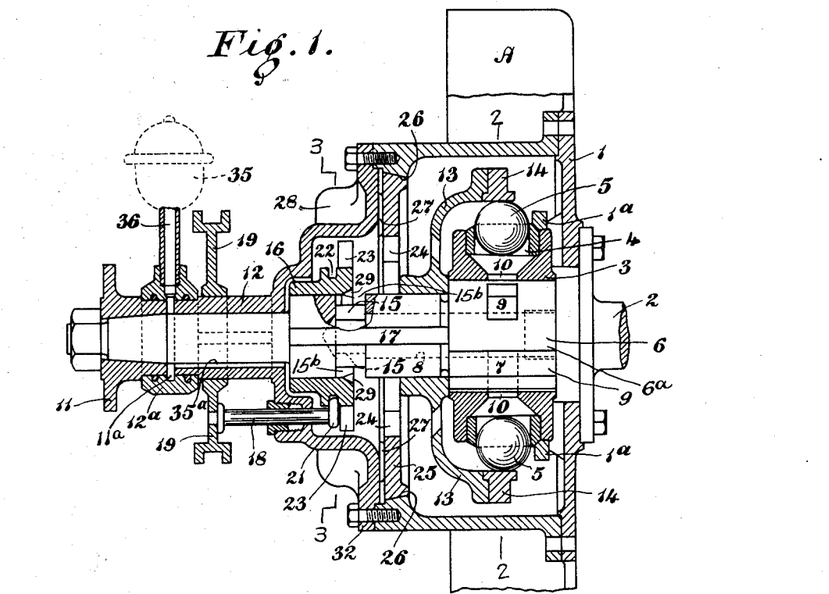
Figure 1 is a sectional elevation of the clutch and in which the casing revolves and wherein the control is effected by a sleeve which slides along the driven shaft over radial openings in said shaft, which openings communicate with a passageway extending axially of said shaft.
Figure 2:
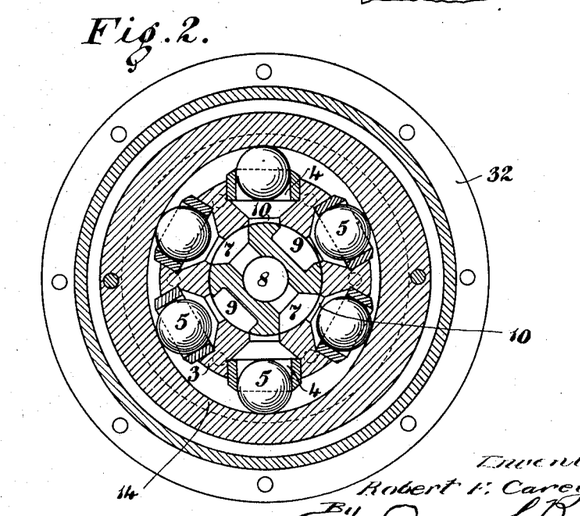
Figure 2 is a vertical section on the line 2—2 of Figure 1.
Figure 3:
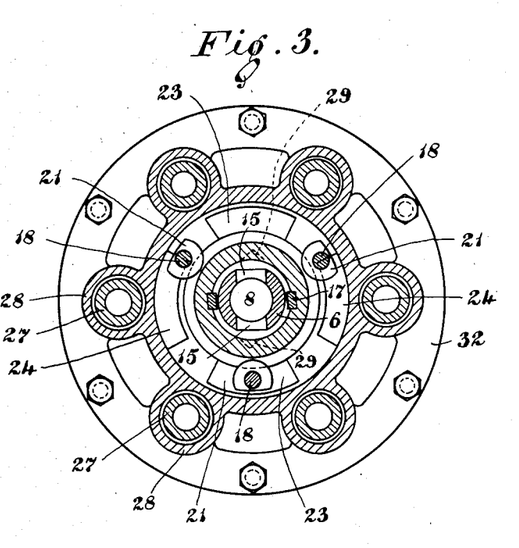
Figure 3 is a vertical section on the line 3—3 of Figure 1.

I will first describe that embodiment of my invention in which the outer casing is attached to the driving shaft of the prime mover and revolves with it, as shown in Figures 1, 2 and 3.

Attached to the casing 1, at the end nearest the driving shaft 2, by webs $1^a$ on the casing 1 is the rotor 3 consisting of a circular block of metal having radial apertures 4, say six in number, which act as cylinders and in each aperture 4 is situated a ball 5 having a working fit in the aperture 4 and acting as a revolving reciprocating piston. The rotor 3 is bored to permit the rotor 3 to run on a central shaft 6 which enters said bore and acts as a bearing. This central or driven shaft 6 acts as the valve or fluid distributing apparatus and its end nearest the driving shaft is at some little distance from the casing 1 and the part which enters the rotor 3 is formed with a pair of diametrically opposed pressure or outlet ports 7, 7 which ports 7, 7 are connected to a central pressure chamber passage 8 drilled along the axis of the shaft 6 and plugged at the end by the plug $6^a$. The shaft 6 also has two inlet ports or slots 9, 9 open to the casing 1 at one of its ends near the driving shaft. These ports 9, 9 are also situated diametrically opposite each other. Ports 10 of the rotor 3, which are connected with the cylinders 4, are also connected twice to inlet and twice to outlet alternately in one revolution of the rotor 3.

The shaft 6 is connected to the driven work say by a coupling flange 11 and its end extends from the casing 1 through a neck 12 attached thereto and projects beyond same into a non rotating ring piece $12^a$ encircling recessed portions in both the neck 12 and the flange 11. Two packings are provided in the ring piece $12^a$ between which a groove $11^a$ is situated, such groove $11^a$ communicating with an expansion vessel 35 by a pipe 36 and with the interior of the casing 1 by the groove $35^a$. Next to the rotor 3 and secured to the shaft 6 is a flange or disc 13 to which is fixed an elliptical track 14 which entirely surrounds and embraces the rotor 3 and the cylinders 4 and pistons 5 of the latter in such a manner that the pistons 5 roll against the track 14.

Between the flange 13 and the ring piece $12^a$ holes 15 are formed through the shaft 6 at right angles to and communicating with the central hole or passage 8 to which the outlet ports 7, 7 are connected. A collar or sleeve 16 having a good fit on the shaft 6 and which revolves with said shaft but is capable of sliding on keys 17 on said shaft, serves to cover and uncover the holes 15, 15. This sleeve 16 is actuated by means of rods 18 passing out of the casing 1 and attached to a circular plate 19 surrounding the neck 12, which plate 19 can be moved by a controlling lever or other mechanism in well known manner. The rods 18 are provided with buttons 21 engaging a groove 22 cut in the sleeve 16.

This sleeve 16 when moved away from the holes 15, 15 leaves the passages clear for a free circulation of liquid, the action being as follows. When the casing 1 and rotor 3 at the driving end are revolved by the prime mover through the shaft 2, the ball pistons 5 move outward under centrifugal force and press against the elliptical track 14 which, for the time being, remains stationary, and revolve around it. By reason of the shape of the track, the pistons 5 reciprocate twice in and out of their cylinders per revolution of the rotor 3.

As the pistons 5 move outward under centrifugal force, their respective cylinders are placed in communication with the inlet ports 9, through which fluid flows from the casing 1 into the cylinders, and, when the pistons are being forced inward by the track, are put into communication with outlet ports 7, 7 and through the central passage 8 and right angled holes 15 back to the casing 1. In this position of the sleeve 16 the liquid (preferably oil) will circulate freely the case 1 and rotor 3 revolving with the driving end and the shaft 6, disc 13, track 14, sleeve 16, and coupling flange 11 i. e. the driven end, remaining stationary.

When the circular plate 19 and the sleeve 16 are moved to cause the sleeve 16 to partially cover the holes 15, 15 the pressure on the oil in the delivery portion of the system rises until the pressure is such (because of the restricted orifice and consequent increased liquid speed with increased inertia and friction) that the resistance of the driven end is equalled. After this point is reached any further restriction of the holes 15 will cause the driven end to revolve and the greater the restriction the faster the driven end will revolve until, when the sleeve 16 has entirely closed the holes 15, the driven end will be driven through the locked oil at a speed nearly equalling that of the driving end but not quite equalling the latter owing to the small loss due to leakage.

Advantage is taken of this small lag to further move the sleeve 16 to cause lugs or teeth 23 formed on said sleeve to engage lugs or teeth 24 formed in a disc 25 which has an angled periphery engaging an angled ring seating 26 formed in the casing 1, and such disc is thus pressed up against the seating 26 by springs 27 (Fig. 15) positioned in cavities formed by bulbous projections 28. In the casing 1 (see more particularly Figure 15) in order that no overdue strain may be thrown on the teeth, this disc 25 is mounted to slip if the maximum torque is exceeded. Such disc 25 may be dispensed with and the teeth 24 be made to engage teeth formed on the casing or other suitable part of the revolving driving end so as to obtain a solid drive at full speed. The lag makes it possible for the teeth to come into engagement without undue shock since at that time the two ends are running at nearly the same speed.

An important point in the design of the sleeve or control valve or any equivalent device used for restricting and shutting off the liquid passage is to so design it that, when full open for free circulation, as large an area as possible is obtained to avoid, as far as possible, the generation of pressure.

This means that, if the sleeve 16 is merely passed over the holes to shut them off, a long movement would be necessary before the restriction was great enough to cause movement of the driven end, in which event only a comparatively short further movement would be available to give the further restrictions necessary to obtain all variations of speed up to full speed.

In order to get delicacy and fineness of control over as great a part of the movement of the control lever or other device as possible, it is necessary to arrange that the first part of the movement very rapidly closes the greater part of the outlet holes 15 and thus leave only a very restricted area available to be further reduced in as gradual a manner as possible with the lever movement available.

In other words, the driven end will not begin to move, if the resistance is considerable, until the greater part of the area is closed and the pressure has increased to the requisite amount to cause movement at all, and the control for giving the different speed must be effected on the remaining small area, which control should be spread over as much of the stroke of the control lever as possible.

One method for accomplishing this is to form a groove 15$^b$ round the shaft 6 where the right angle holes 15 are drilled into the central passage, as will be understood from Figure 1, so that the sleeve, instead of cutting off the passageway by simply passing over the holes 15, which would cover said holes gradually, can, by a very small movement, cut off a very large area since the whole circumference of the shaft is involved.

As the passageway through the holes 15 is closed, one or more V or diminishing triangular section or other suitable grooves 29 formed in the sleeve 16, and which can be made any desired area, are available to give the speed control over a comparatively large movement.

Figure 4:
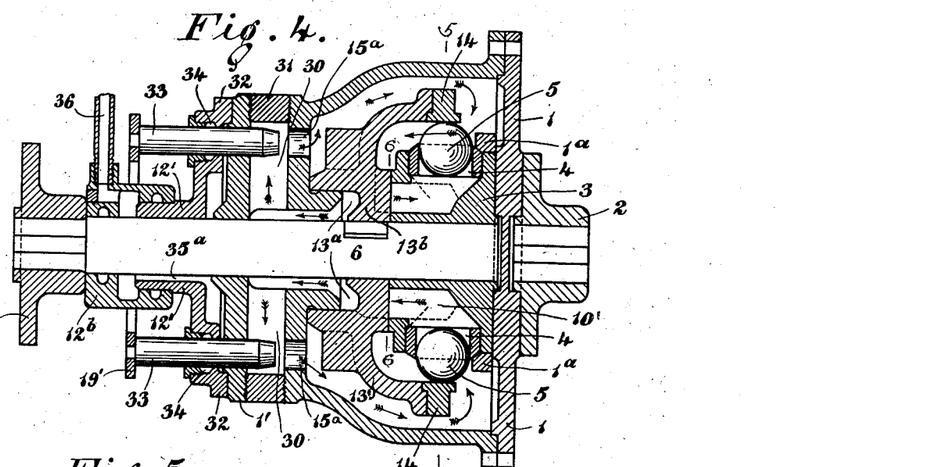
Figure 4 is a sectional elevation of an embodiment of the clutch wherein the casing revolves and in which the control is effected by rods which engage in holes in a disc or wall of the casing.
Figure 5:
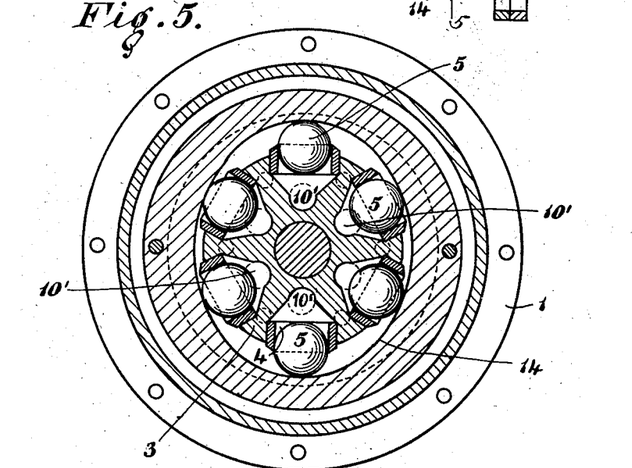
Figure 5 is a section on the line 5—5 of Figure 4.
Figure 6:
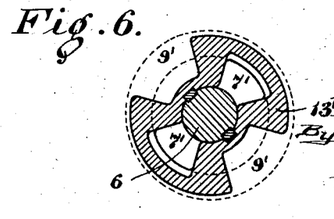
Figure 6 is a section on the line 6—6 of Figure 4.

According to Figures 4, 5 and 6, instead of the inlet and outlet ports being formed in the shaft 6, outlet ports 7' and inlet ports 9' may be formed in the flange or disc 13' to which the track 14 is attached, the flange or disc 13' at the portion having these ports being in the form of a flat ring disc or valve against which the side of the rotor 3, having the openings to the cylinders is held, preferably by the pressure in the apparatus acting on an annular space 13$^a$ surrounding the shaft.

In these figures the construction is somewhat different from that shown in Figures 1, 2 and 3. For instance, instead of closing the holes in the shaft 6 as in Figures 1 to 3, I dispense with the hollow shaft and provide a chamber 30 in the casing 1, which is closable by plugs 31, and from the chamber 30 I provide passageways 15$^a$ leading into the casing 1 and to this casing 1 I connect another plate 32 having a neck 12' carrying the plate 19'. In this case the plate 19' has two rods 33, 33 which pass through stuffing boxes 34, 34 in the plate 32 and apertures in a bridge extending across the casing 1 through the chamber 30, and then into the passageways 15$^a$ for controlling the passage of fluid into and from the casing 1, and the ring piece 12$^b$ instead of carrying the coupling flange 11 and neck 12, carries the shaft 6 and neck 12'. In this case the fluid passes from the cylinders through the ports 7' and space 13$^a$ into the chamber 30 and out by the passageways 15$^a$, to the casing containing the track disc.

The circulation of the liquid should be such as to ensure that the oil may constantly pass the casing where it is exposed to the air for cooling purposes, and provision should be made for expansion and contraction of the oil or other liquid used as the clutch medium.

Where a fixed casing is used, all that is necessary for this latter purpose is to provide a cup or expansion vessel such as 35, as shown in Fig. 1, connected by a pipe 36 to the casing.

When the casing revolves, a similar cup attached to a ring piece encircling the end of the casing, which piece does not revolve, will allow the fluid to pass from the cup 35 to the casing inside the plate 32, or vice versa, through the grooves or passages 35$^a$ provided for the purpose and thus allow for expansion.

Another method is to not quite fill the casing with liquid but to leave an air filled space by which means expansion and contraction are allowed for.

In the latter case provision must be made to prevent the air from mixing with the oil in the circulating system.

This can be done by providing a sac or pocket near the centre where the air will collect, the oil being heavier, being driven outwards.

Figure 7:
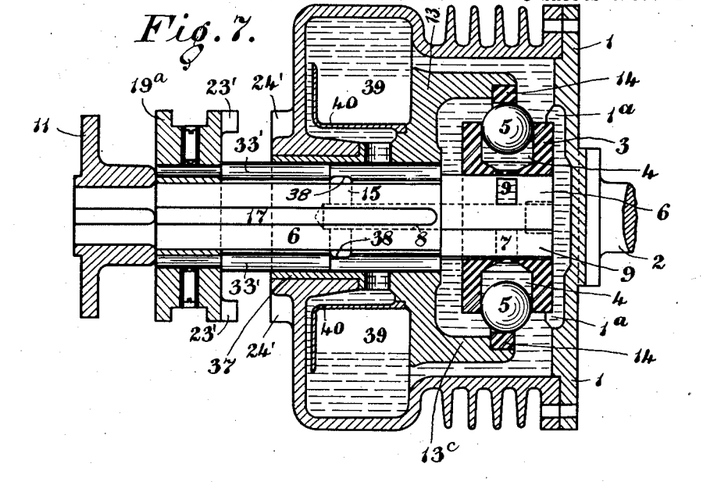
Figure 7 is a sectional elevation of an embodiment of the clutch wherein the casing revolves and in which the casing is only partially filled with liquid, an air space being left or provided to allow for expansion and contraction of the liquid.
Figure 8:
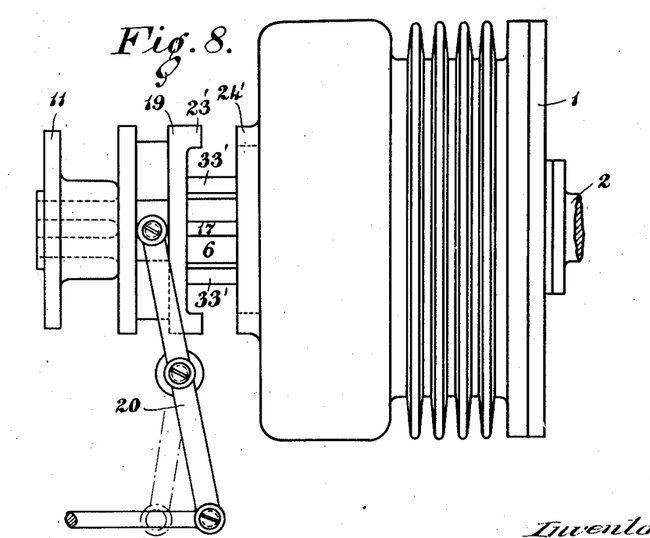
Figure 8 is a view in elevation of the embodiment of the clutch shown in Figure 7, showing the lever mechanism for actuating the clutch.

A clutch constructed for this purpose is shown at Figures 7 and 8.

In this construction the hollow ported end of the shaft 6 shown in Figure 1 is employed and the circular plate 19$^a$ is provided with lugs 23' which enter recesses 24' on the outside of the casing 1 in order to give a solid drive, and such plate 19$^a$ carries rods 33' which enter tubes 37 having holes 38 communicating with holes 15 of the shaft 6.

The casing 1 is provided with a ring pocket 39 formed in the casing 1 by an angled ring 40 secured to the flange 13$^c$ near the centre so as to divert the passage of oil around same and the air will be pocketed next to the angled ring 40, the oil which is heavier being driven outwards.

In this construction the control is obtained by the rods 33' entering the tubes 37 and gradually covering the holes 38 and, by the time the holes 38 have been closed, the teeth 23'' have engaged the teeth 24' and a solid drive at full speed is obtained.

This method is satisfactory only up to certain speeds unless the air pressure in the casing be raised to suit, since otherwise the centrifugal tendency of the oil becomes too great to allow the liquid to feed the cylinders.

The arrangement shown in Figure 1 is designed primarily for connection with a motor lorry and in that case is attached to the fly wheel A on the driving shaft.

Figure 9:
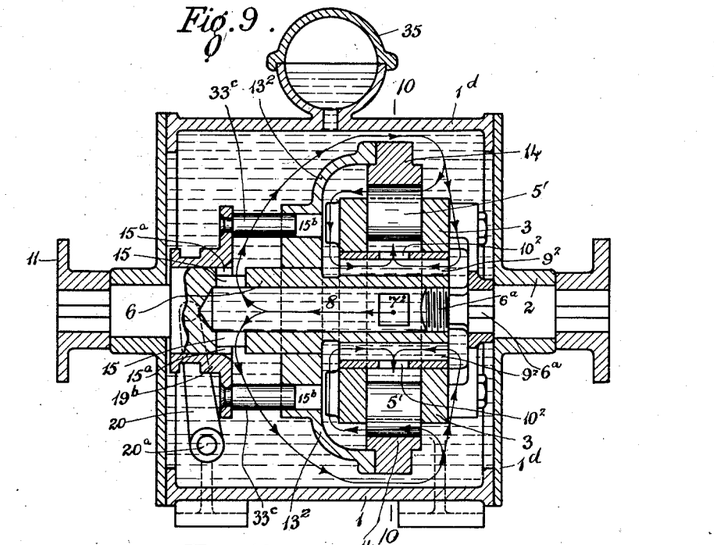
Figure 9 is a longitudinal section of an embodiment of the clutch wherein the casing is fixed and the control is effected in a manner similar to Figure 1, the pistons being shown as roller pistons.
Figure 10:
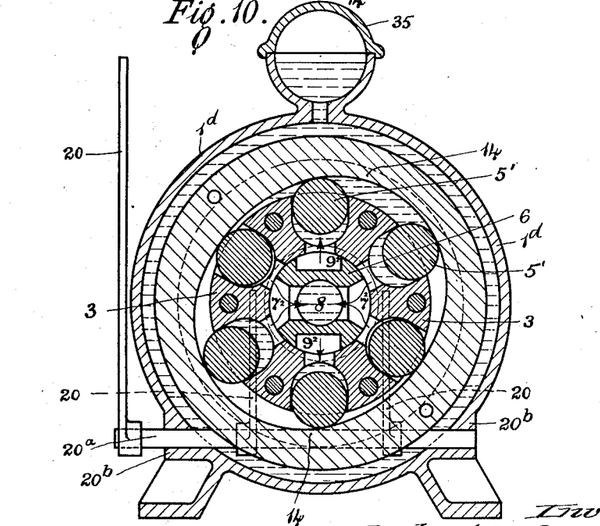
Figure 10 is a vertical section on the line 10—10 of Figure 9.

According to Figures 9 and 10 I employ a fixed casing 1$^d$ and roller pistons 5'. Otherwise the construction is similar to Figures 1 to 3.

The pistons 5', being roller pistons, require that the cylinder bore be square or oblong. This is obtained by making the rotor in three parts, viz: a central portion, which is milled out to receive the roller pistons, and two side plates bolted to the center portion.

The shaft 6 carries the circular plate 19$^b$ which is actuated by an arm 20 on a shaft 20$^a$ journaled in stuffing boxes 20$^b$ in the casing 1, and the circular plate 19$^b$ also carries rods 33$^c$ which enter holes 15$^b$ in the disc 13$^2$.

The action is the same as in Figures 1 and 3 except that oil is also admitted to the ports 9$^2$, 9$^2$ on both sides of the rotor, instead of on one side as in Figure 1, the direction of the circulation being as shown by the arrows. The rods 33$^c$, which extend into the holes 15$^b$ function to connect the disc 13$^2$ with the plate 19$^b$ so that the two revolve together.

Figures 11, 12, 13 and 14 show various types of pistons.

Figures 11, 12, 13, 14, 15:
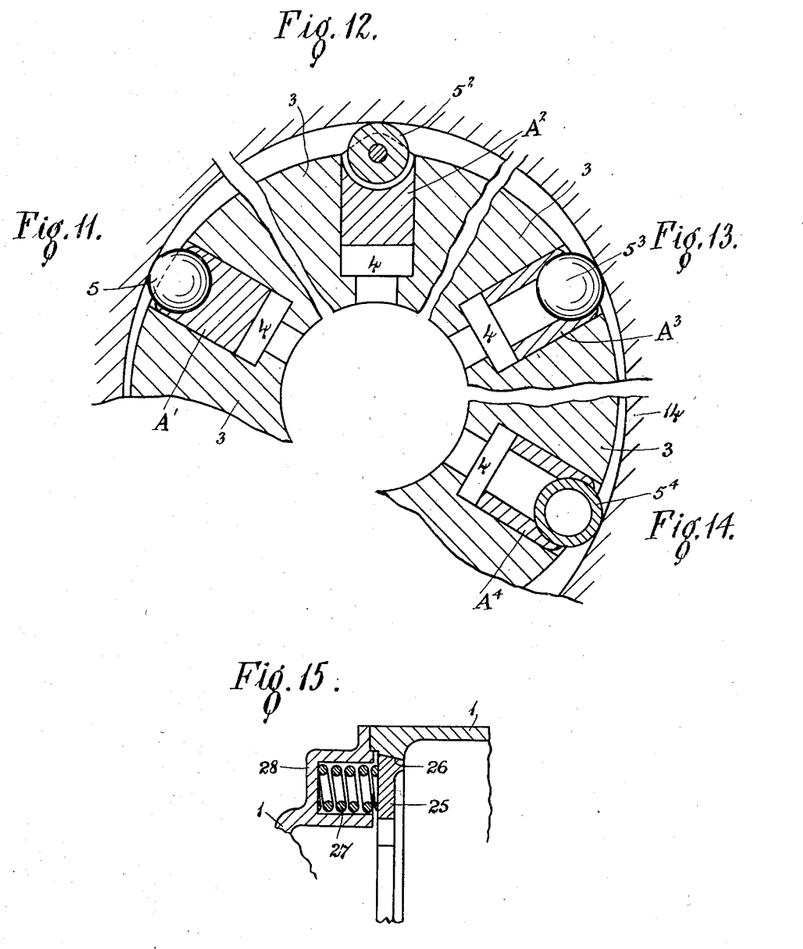
Figures 11, 12, 13 and 14 are each a section of a rotor and a piston and showing various forms of pistons.
Figure 15 is a section of a portion of the casing and disc shown in Figure 1 and showing a spring which serves to press the disc against the casing.

Fig. 11 shows a solid ball piston 5 connected to and retained by a solid block or plunger A′ sliding in the cylinder 4, the lubrication being from the casing, the pressure acting on the plunger A′.

Fig. 12 shows a roller piston $5^2$ pivoted to a bifurcated end of a solid block or plunger $A^2$ sliding in the cylinder.

Fig. 13 shows a solid ball piston $5^3$ connected to and retained by a tubular block $A^3$, the pressure in the cylinder acting on the ball.

Fig. 14 shows a hollow roller piston $5^4$ connected to and retained by a tubular plunger or block $A^4$ for pressure in cylinder to act on roller $5^4$.

Fig. 15 is a detail view of the mountings for the springs for drawing the angled ring shown in Fig. 1 to its seat.

What I do claim as my invention and desire to secure by Letters Patent is:—

1. A hydraulic clutch comprising a fluid-containing casing, a pressure chamber associated with said casing and normally in communication with the latter, a driving member, a driven member, a cam track within said casing and connected to said driven member, a rotor within said casing connected to said driving member, said rotor having a plurality of radially arranged open-ended cylinders and a plurality of passageways each leading to the inner end of one of said cylinders, a piston working in each of said cylinders and adapted to project from the outer end of the latter into engagement with said cam track, means for bringing each of the passageways of said cylinders alternately into communication with said fluid-containing casing and with said pressure chamber, and means for throttling the flow of fluid from said pressure chamber to said fluid-containing casing and maintaining pressure behind said pistons to cause the latter to clutch said cam track.

2. A hydraulic clutch comprising a fluid-containing casing, a pressure chamber associated with said casing and normally in communication with the latter, a driving member, a driven member, a cam track within said casing and connected to said driven member, a rotor within said casing connected to said driving member, said rotor having a plurality of radially arranged open-ended cylinders and a plurality of passageways each leading to the inner end of one of said cylinders, a plurality of pistons each working in one of said cylinders and adapted to project from the outer end of the latter into engagement with said cam track, means for bringing each of the passageways of said cylinders alternately into communication with said fluid-containing casing and with said pressure chamber, and means operable during a part of its movement to throttle communication between said pressure chamber and said fluid-containing casing to maintain pressure behind said pistons and to cause same to clutch said cam track, said means operable during its further movement to connect said driving member directly to said driven member.

3. A hydraulic clutch comprising a fluid-containing casing, a pressure chamber associated with said casing and normally in communication with the latter, a driving member, a driven member, a cam track within said casing and connected to said driven member, a rotor within said casing connected to said driving member, said rotor having a plurality of radially arranged open-ended cylinders and a plurality of passageways each leading to the inner end of one of said cylinders, a plurality of pistons each working in one of said cylinders and adapted to project from the outer end of the latter into engagement with said cam track, valve means associated with said driven member and operable to alternately permit the flow of liquid from said fluid-containing casing through said passageways of said cylinders and from said cylinders to said pressure chamber, and means for throttling communication between said pressure chamber and said fluid containing casing.

4. A hydraulic clutch comprising a fluid-containing casing, a pressure chamber associated with said casing and normally in communication with the latter; a driving member; a driven shaft having bearing in said casing; a cam track within said casing and connected to said driven shaft; a rotor within said casing connected to said driving member and rotatable on said driven shaft; said rotor having a plurality of radially extending open-ended cylinders and also having a plurality of passageways, one for each cylinder, leading to said cylinders adjacent the inner ends of the latter; a plurality of pistons, one working in each of said cylinders and projecting from the outer end of the latter into engagement with said cam track; valve means associated with said driven shaft and adapted upon the rotation of said rotor to alternately bring each of the passageways of said cylinders into communication with said casing and with said pressure chamber, and means for controlling communication between said pressure chamber and said casing to restrict and to shut off the flow of liquid from the inner ends of said cylinders through said pressure chamber to said casing.

In testimony whereof I have hereunto set my hand.

ROBERT FALKLAND CAREY.